United States Patent [19]

Witt

[11] Patent Number: 4,552,257
[45] Date of Patent: Nov. 12, 1985

[54] OVERLOAD PROTECTION MECHANISM FOR CLUTCHES

[75] Inventor: Ronald A. Witt, Milwaukee, Wis.

[73] Assignee: The Falk Corporation, Milwaukee, Wis.

[21] Appl. No.: 544,253

[22] Filed: Oct. 21, 1983

[51] Int. Cl.$^4$ ............................................. F16D 7/02
[52] U.S. Cl. ................................ 192/56 F; 192/88 B
[58] Field of Search ................... 192/56 F, 79, 88 B, 192/150

[56] References Cited

U.S. PATENT DOCUMENTS

| 2,277,554 | 3/1942 | McCoy | 192/88 B |
| 2,354,174 | 7/1944 | Schmitter | 192/88 B |
| 3,489,254 | 1/1970 | Sparrow | 192/3.29 |

OTHER PUBLICATIONS

Bulletin 851-100 of The Falk Corporation, dated Feb. 1973.

Primary Examiner—Stephen F. Husar
Attorney, Agent, or Firm—Quarles & Brady

[57] ABSTRACT

An overload mechanism for an air inflatable gland clutch operates to open an air valve to release air from the gland when an overload condition is sensed. The air valve is opened by a piston rod actuator which is urged by a spring to engage a valve stem of the air valve. The piston operates in a cylinder on a rim on one face of the gland. The rod actuator is normally blocked from engaging the valve stem by the arm of a bell crank lever journaled on a shaft. The other arm of the bell crank lever engages a pin on a motion hinge secured to the shaft. A pin urges the motion hinge and bell crank lever into cooperative engagement to rotate together with the shaft. The shaft is rotated by a crank actuator which is mounted on a clutch shoe secured to the opposite face of the gland. When an overload condition exists, it will be reflected in the relative angular motion between the shoe and rim such that the crank actuator will rotate the shaft a predetermined amount sufficient to remove the arm of the bell crank lever from its obstruction of the rod actuator. The rod actuator is reset by admitting air under pressure to the rod end of the piston.

6 Claims, 5 Drawing Figures

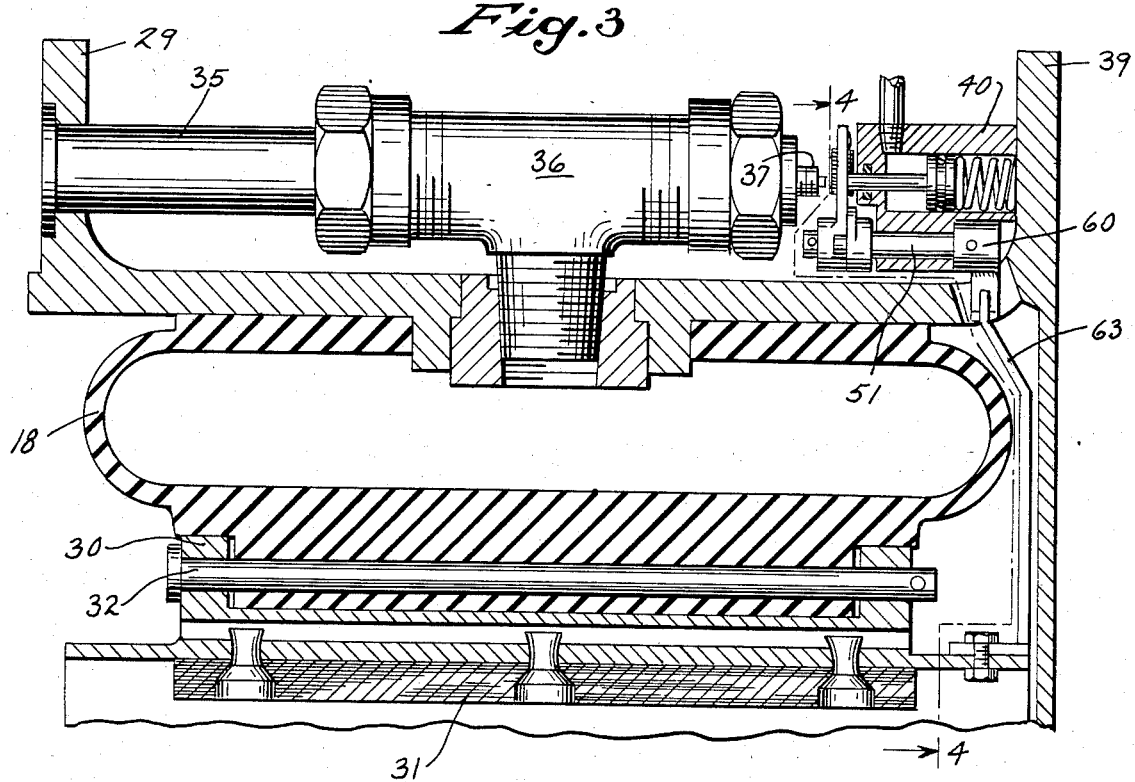
Fig.3
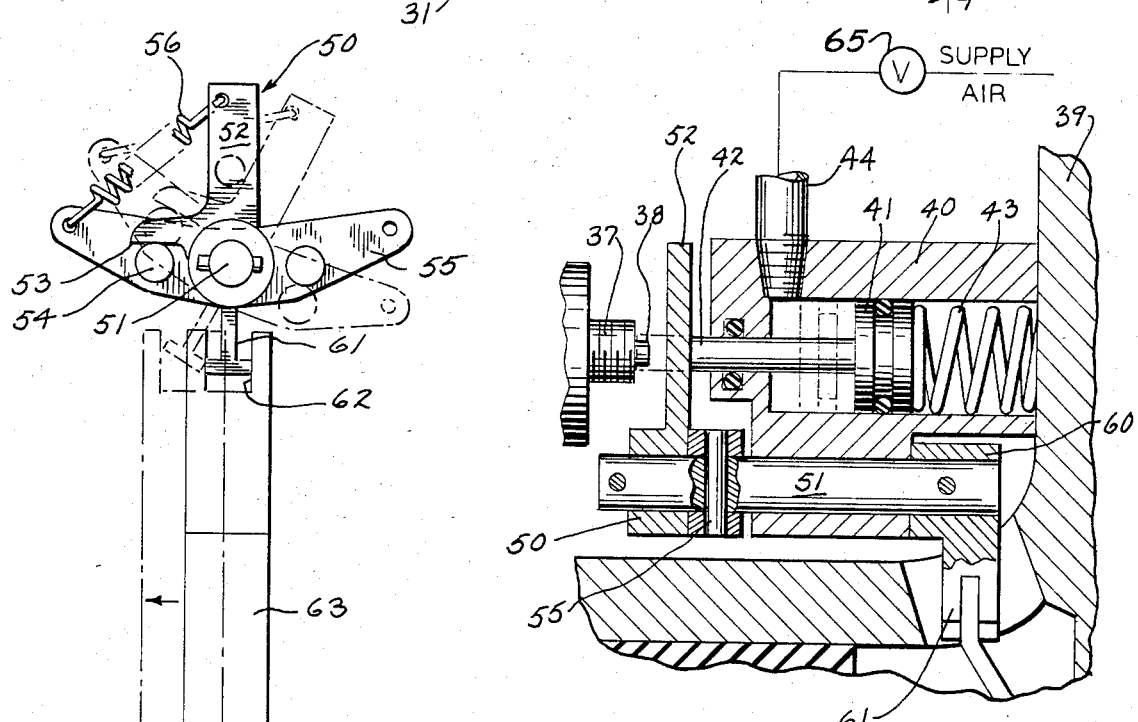
Fig.4
Fig.5

4,552,257

OVERLOAD PROTECTION MECHANISM FOR CLUTCHES

BACKGROUND OF THE INVENTION

This invention relates to pneumatic clutches, and particularly to a mechanism for protecting such clutches from potentially damaging overload conditions.

Pneumatic clutches find use in many applications and are particularly used in marine engine drives. The clutches connect an engine to a gear drive which in turn drives a ship's propeller. Typically, there will be one pneumatic clutch for ahead direction and another for astern direction of travel.

The common form of pneumatic clutch uses an inflatable annular gland. The typical gland-type clutch has a series of clutch shoes mounted on the inner periphery of the gland. Air under high pressure is admitted to the interior of the gland to expand it thereby bringing the clutch shoes into engagement with clutch drums. The glands are typically manufactured from rubber with reinforcement plys.

Torque is transmitted by the friction developed between the clutch shoes and the clutch drums. The amount of torque that the clutch can carry is dependent on the physical size of the clutch, the air pressure, and the coefficient of friction between drum and shoes.

The marine vessels on which these clutches are used are often operated in rivers in which floating debris is routinely encountered. Occasionally the propellers become jammed due to a log or other debris being caught between the propeller and the ship's hull or to a steel cable being wrapped around the propeller. When such a jam occurs, a high shock load results due to the inertia of the system and the energy of the engine. The shock and energy is reflected in the clutch and, as a result, the shoes tend to slip on the drum. When this happens, a large amount of heat is generated between the clutch shoes and the drum and thermal stresses are introduced into the drum which can lead to failure of the drum.

This invention concerns a mechanism to release the clutch when an overload condition occurs so as to prevent destruction of the clutch elements. The mechanism relies on a rotational stiffness constant between the clutch driving and driven members.

SUMMARY OF THE INVENTION

In accordance with the invention I provide an overload mechanism for an air inflatable flexible gland in which the valve stem of an air valve operatively connected to the gland is adapted to be engaged to open the valve by an actuator which is normally held out of engagement but which is released when the relative angular movement between opposite sides of the gland exceeds a predetermined amount which is indicative of an overload condition.

In accordance with a preferred embodiment, the air valve and actuator are mounted on a rim which connects to one side of the flexible gland. The actuator is a rod of a piston which operates in a cylinder and is spring loaded to an extended position toward said stem and is reset to an inward position by admitting air under pressure to the rod end of the cylinder. The actuator rod is held out of engagement by an arm which is mounted on a shaft which can be rotated by a crank actuator mounted on a shoe secured on the opposite side of the flexible gland. When the relative movement between the shoe and the rim exceeds a preselected amount, the arm will have been rotated by the shaft out of engagement with the end of the actuator rod which can then engage the valve stem and open the air valve.

It is a principal object of the present invention to provide a mechanism which responds to relative angular motion between driving and driven clutch elements to sense an overload condition and then automatically release the air pressure in the clutch.

It is another object of the present invention to provide such an overload mechanism which can be reset manually or remotely by the pneumatic control for the clutch.

The foregoing and other objects and advantages of the invention will appear in the description which follows. In the following description, reference is made to the accompanying drawings which illustrate a preferred embodiment of the invention.

BRIEF DESCRIPTION OF THE DRAWINGS

FIG. 3 is a view in cross-section through the gland of a clutch and the mechanism of the present invention;

FIG. 4 is a view in elevation of the overload protection actuating mechanism showing alternative positions of such mechanism in full and in phantom lines; and FIG. 5 is an enlarged cross-sectional view of the overload release valve of the mechanism of the present invention.

DETAILED DESCRIPTION OF THE PREFERRED EMBODIMENT

Figure 1:
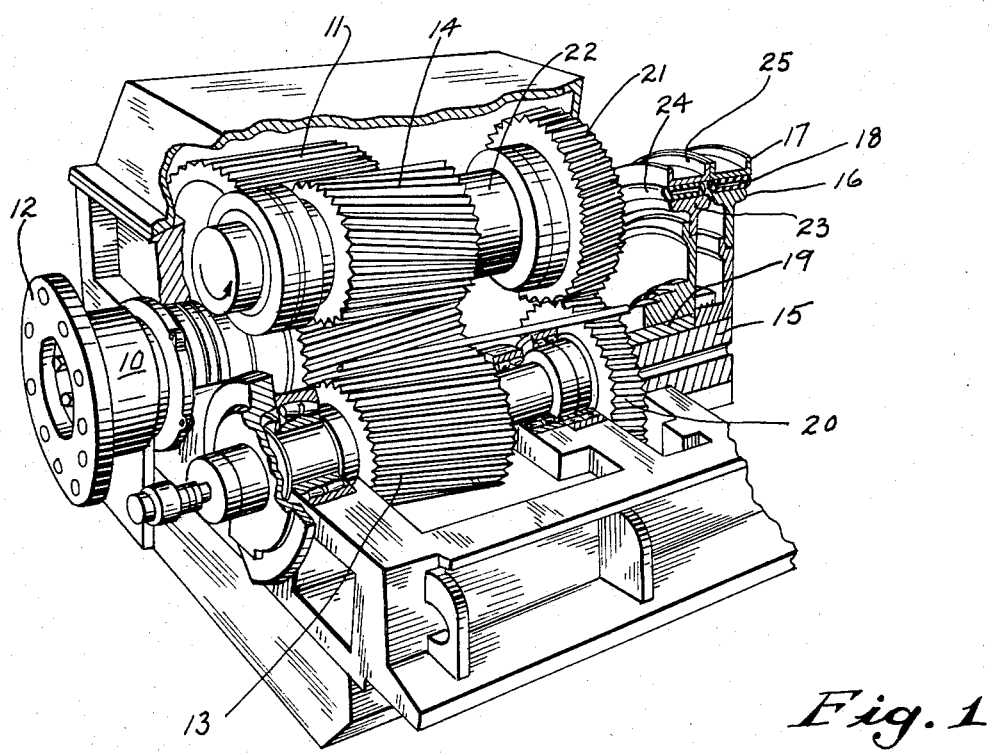
FIG. 1 is a view in perspective, with portions cut away, of a marine drive of the type which would utilize the clutches of the present invention.

FIG. 1 illustrates a marine drive in which the present invention might be employed. The drive is of known construction and operation. Generally, it includes an output shaft 10 which mounts a main or bull gear 11 and which carries a flange 12 for connection to a coupling or to another flange which, in turn, connects directly to the propeller shaft. The bull gear 11 is driven alternatively by a forward pinion 13 and a reverse pinion 14, both of which are at all times in mesh with the bull gear 11.

The ahead or forward pinion 13 is mounted on an ahead or forward pinion shaft 15 which mounts an ahead clutch drum 16. The drum 16 is adapted to be operatively connected to an ahead clutch 17 driven by the prime mover which is typically a diesel engine. The ahead clutch 17 includes an air actuated flexible gland 18 which when inflated will engage and drive the ahead drum 16. Surrounding the forward pinion shaft 15 is a hollow reverse input gear shaft 19 and gear 20 journaled in the housing and meshing with a reverse idler gear 21 mounted on a reverse pinion shaft 22 which also mounts the reverse pinion 14. The reverse input gear shaft 19 also mounts a reverse clutch drum 23 which is adapted to be operatively engaged by an air expandable flexible gland 24 mounted on a reverse clutch 25.

In operation, the clutches 17 and 25 are connected to and driven continuously by the engine. Air is supplied selectively to either the ahead or reverse clutch gland 18 or 24, as desired. For ahead rotation, the gland 18 of the ahead clutch 17 is inflated to frictionally engage the ahead clutch drum 16 thereby driving the forward pinion shaft 15 and providing direct single reduction drive through the forward pinion 13 and the bull gear 11 to the propeller shaft. While this is occurring, the reverse train of gears with the reverse clutch 25 disengaged will idle freely, driven by the bull gear 11.

For astern rotation, the ahead clutch 17 is released and the gland 24 of the reverse clutch 25 is inflated so that the reverse drum 23 mounted on the reverse input shaft 19 is driven. This drives the reverse input gear 20 and the reverse idler gear 21 and thereby drives the reverse pinion 14. This has the effect of rotating the bull gear 11 in the opposite direction.

Figure 2:
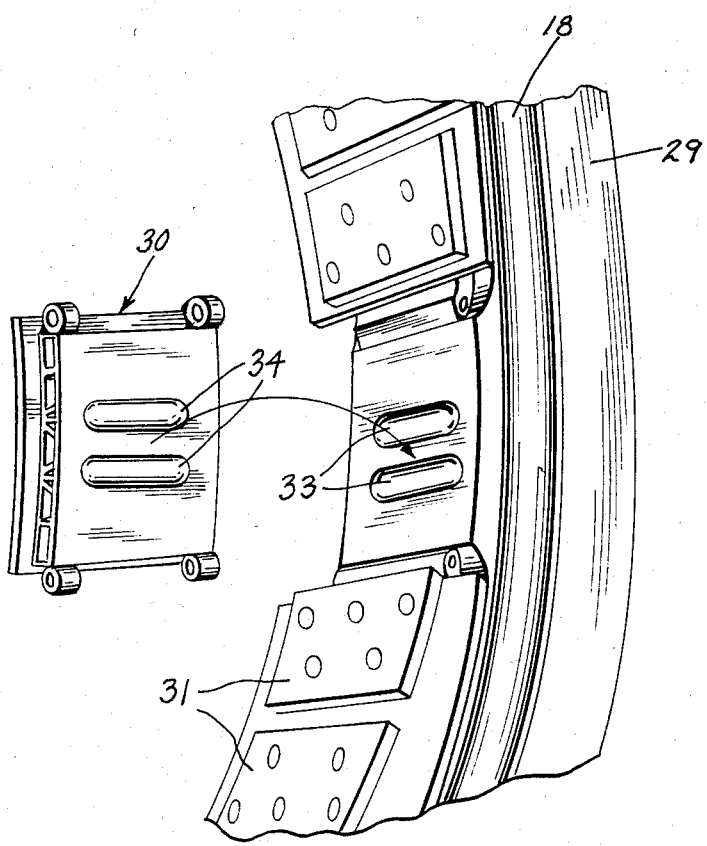
FIG. 2 is a view in perspective of a section of the inner periphry of the clutch gland showing one clutch shoe removed from its normal location.

Each of the forward and astern clutches are of identical design so that only one will be described hereafter as being typical of both. Referring to FIGS. 2 and 3, the inflatable rubber and fabric gland 18 is bonded to an outer steel rim 29. Clutch shoes 30 are mounted on the inner periphery of the gland 18. The shoes 30 are formed of aluminum with axial air passages to provide ventilation. The shoes 30 mount friction liner blocks 31 which are riveted to the aluminum shoes. The shoes 30 are separately removable and are connected by through pins 32 to the gland. Rubber lugs 33 on the inner surface of the gland engage in complementary recesses 34 on the rear face of the clutch shoes. What has been described thus far is well known in these forms of rubber gland clutches.

An air tube 35 extends through one flange of the clutch rim 29 and connects to one branch of a T-fitting 36. The middle branch of the T-fitting extends through the rim 29 and communicates with the interior of the gland 18. The remaining connection of the T-fitting 36 mounts an air valve 37 of the common type used for inflatable automobile tires. The air valve 37 has a center stem 38 which is spring loaded to an outwardly extending position in which the valve is closed and which, when depressed, will release air through the valve. The air tube 35 and the fitting 36 are employed to inflate and deflate the clutch in accordance with known control systems such as those disclosed, for example, in U.S. Pat. No. 3,727,737 issued Apr. 17, 1973 to Phinney. The function of the mechanism of the present invention is to provide a means to actuate the air valve 37 to open the same under overload conditions so that air can be immediately released from the interior of the gland 18.

Referring to FIGS. 4 and 5, affixed to an inner face of the second flange 39 of the rim 29 is an actuator body 40 having a cylinder bore which receives a piston 41 whose rod 42 extends out of the actuator body 40 and is aligned with the stem 38 of the air valve 37. The piston 41 is urged to a position outwardly of the cylinder bore by a helical spring 43 and is urged inwardly by air pressure on its rod end, when air pressure is introduced through a hose 44. If the piston is free under the urging of the spring 43 to extend outwardly of the actuator body 40, the rod 42 will engage the actuator stem 38 and open the air valve 37. However, during normal operation of the clutch, the rod 42 is axially restrained by a mechanism which is responsive to the clutch operation and which will sense overload conditions should they occur.

A rod release bell crank lever 50 is journaled on a shaft 51 which is journaled in the actuator body 40. An upstanding arm 52 of the bell crank lever 50 is adapted to be positioned axially of the rod 42 to prevent its engagement with the stem 38. The other arm 53 of the bell crank lever 50 engages a pin 54 on one arm of a motion hinge 55 which is pinned to the shaft 51. A torsion spring 56 extends between the end of the pin actuator arm 52 of the lever 50 and an end of the motion hinge 55. The inner end of the shaft 51 has secured to it a motion crank 60 which has a depending arm 61 engaged in a fork 62 of a crank actuator 63. The crank actuator 63 is bolted on one protruding side of an aluminum shoe 30.

Any relative angular displacement between the clutch shoe 30 and the clutch rim 29 will cause rotation of the motion crank 60 which through the resulting rotation of the shaft 51, will cause rotation of the motion hinge 55 (see FIG. 4). Rotation of the motion hinge from its normal attitude will carry with it the rod release lever 50 by engagement of the pin 54 with the arm 53 of the release lever 50.

During normal operation when torque is applied to the clutch there is some relative angular displacement between the clutch rim 29 and the clutch shoes 30 which are in engagement with the clutch drum 16. However, when overload conditions are encountered, the degree of angular displacement will exceed a desired amount. This will result in the crank actuator 63 being displaced angularly with respect to the rim 29 and therefore the actuator body 40 a distance sufficient to cause the motion hinge 55 and the rod release lever 50 to rotate by an amount which will move the upright arm 52 of the release lever 50 out of the way of the rod 42. The rod 42 will engage the stem 38 under the urging of the spring 43. This will release the air pressure from the gland 18 by opening the air valve 37. When this occurs, the control system of the vessel will sense a decreasing pressure and deflate the clutch entirely thereby releasing the overload.

When the overload is released, the relative rotation of the clutch shoes 30 to the clutch rim 29 will return to a normal condition, and the crank actuator 63 will return to its relative neutral position with respect to the actuator body 40 thereby returning the motion crank 55 to neutral. The rod 42 will, however, be in the way of the arm 52 of the release lever 50 until it is withdrawn. The rod is withdrawn by applying air under pressure to the rod end of the piston 41. The air may be applied manually or remotely as part of the clutch control system by opening a valve 65 to connect supply air to the hose 44. When the rod 42 is withdrawn into the actuator body 40, the release lever 50 will return to its normal blocking position under the urgings of the spring 56.

To utilize the mechanism for the opposite direction of torque, it is only necessary to remove and reverse the position of the arm 53 of the release lever 50 and to connect the spring 56 to the opposite end of the motion hinge 55.

The linkage to rotate the release lever 50 can be sized for the particular level of overload which is to trigger the release of air from the gland. For example, if the clutch has a load rating of 420,000 inch-pounds and a rotational stiffness constant between the driving and driven members of the clutch of a $59 \times 10^6$ inch-pounds per radian, at overload the driving and driven members will move 0.007 radians in relation to each other. If the radius of the clutch is 24 inches, the rotational motion at the shoe will be 0.17 inches. That amount of relative angular motion is then used to trigger the release of the air valve stem 38.

I claim:

1. An overload mechanism for a pneumatic clutch which includes an air inflatable flexible gland secured at one side to a rim and mounting clutch shoes on its opposite side, said mechanism comprising:
- an air valve operatively connected to said gland and including a valve stem;
- a spring loaded actuator biased to engage said stem to open said valve;
- holding means adapted to be interposed between said stem and actuator to prevent engagement of said stem by said actuator; and
- means responsive to relative movement between said rim and said shoe for moving said holding means from between said stem and actuator to release said actuator.

2. An overload mechanism in accordance with claim 1 together with means for resetting said actuator.

3. An overload mechanism in accordance with claim 1 wherein said actuator is the rod of a piston operating in the bore of a cylinder attached to said rim, said actuator rod being urged outwardly of said cylinder by a spring and being reset inwardly of said cylinder by air under pressure admitted to the rod end of said cylinder.

4. An overload mechanism in accordance with claim 1 wherein said holding means comprises an arm on a rotatable shaft, said arm being movable through an arc with said shaft, and wherein said means responsive to relative movement rotates said shaft and arm.

5. An overload mechanism in accordance with claim 4 wherein said arm is journaled on said shaft and includes a second arm engageable by a pin on a motion hinge secured to said shaft, together with a spring connecting said first arm and said motion hinge to urge said first arm to rotate with said motion hinge.

6. An overload mechanism in accordance with claim 4 wherein said means responsive to relative movement includes a radially projecting crank actuator secured to said shoe and engageable with a crank secured to said shaft to rotate said shaft.

* * * * *